March 25, 1924.

W. J. LUXTON 1,488,212

APPARATUS FOR SOLDERING CANISTERS

Filed Nov. 11, 1922        4 Sheets-Sheet 1

Fig.1.

INVENTOR
W. J. LUXTON
By
Atty

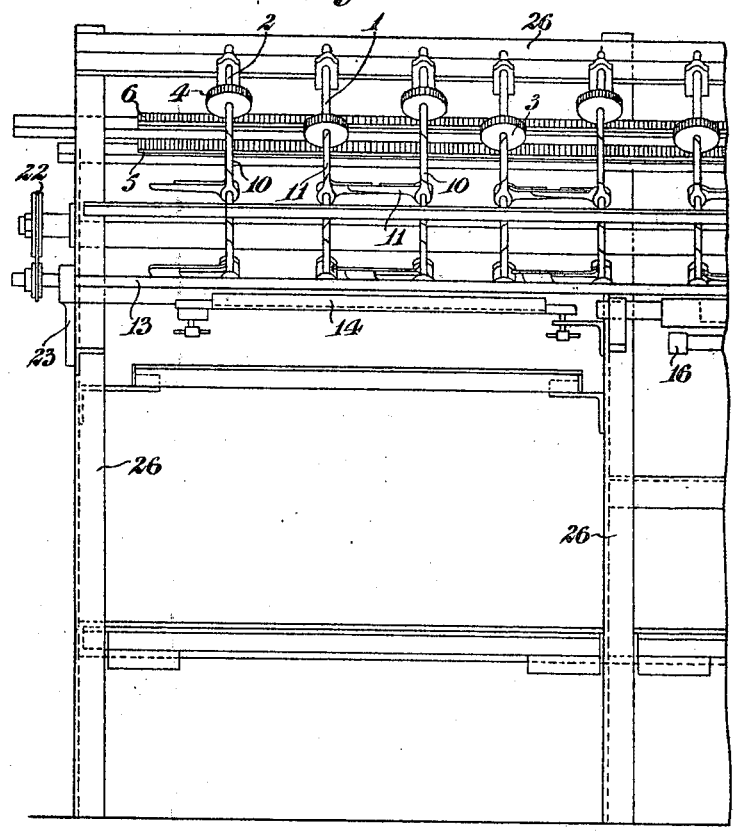

March 25, 1924.
W. J. LUXTON
1,488,212
APPARATUS FOR SOLDERING CANISTERS
Filed Nov. 11, 1922    4 Sheets-Sheet 3
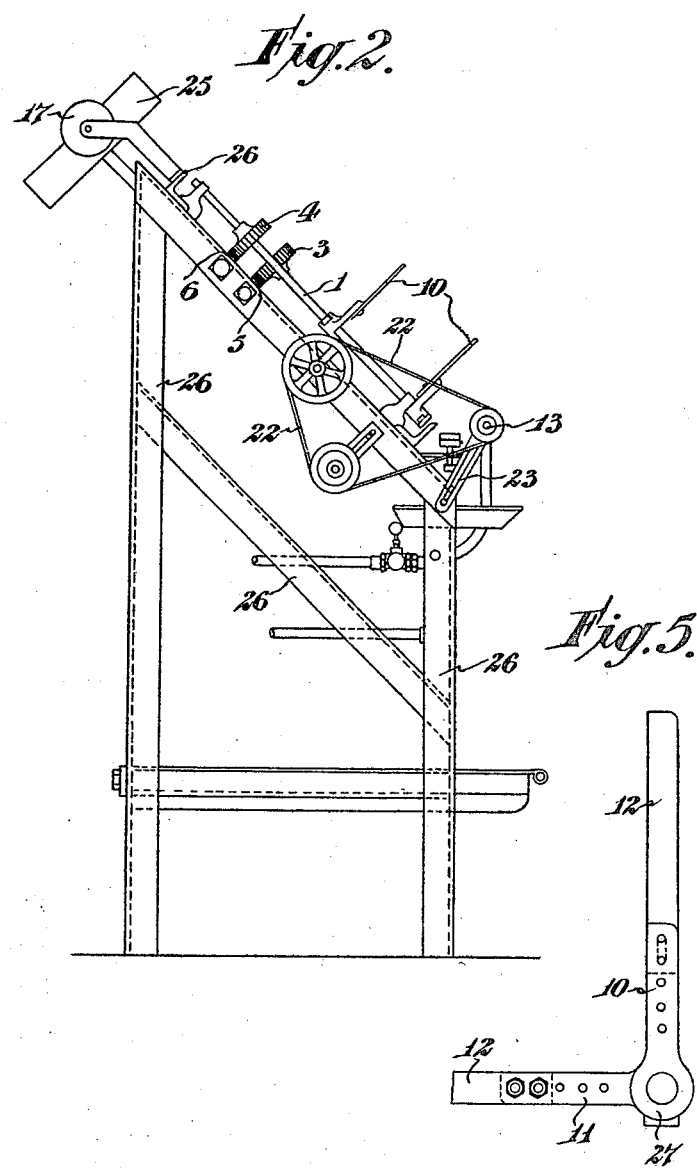

March 25, 1924.
W. J. LUXTON
1,488,212
APPARATUS FOR SOLDERING CANISTERS
Filed Nov. 11, 1922    4 Sheets-Sheet 4
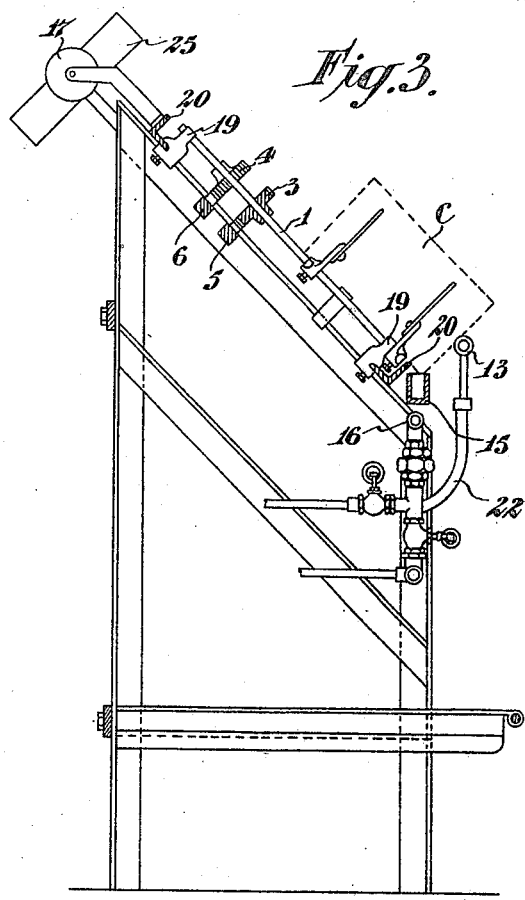
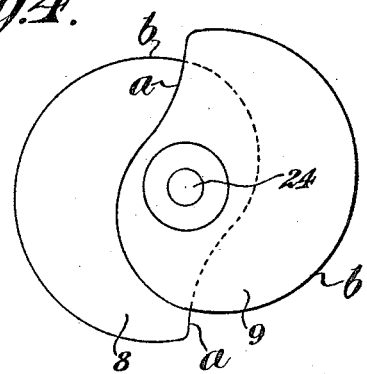
INVENTOR
W. J. LUXTON Patented Mar. 25, 1924.

1,488,212

UNITED STATES PATENT OFFICE.

WILLIAM JOHN LUXTON, OF LIVERPOOL, ENGLAND, ASSIGNOR OF ONE-HALF TO WILLIAM AHIRA GREEN, OF LONDON, ENGLAND.

APPARATUS FOR SOLDERING CANISTERS.

Application filed November 11, 1922. Serial No. 600,368.

*To all whom it may concern:*

Be it known that I, WILLIAM JOHN LUXTON, a subject of the King of Great Britain and Ireland, and a resident of Fazakerley, Liverpool, county of Lancashire, England, have invented a certain new and useful Improvement in Apparatus for Soldering Canisters, of which the following is a specification.

This invention relates to improvements in apparatus for soldering canisters of prismatic section, or flat curved canisters, the invention being particularly applicable for the soldering of sheet-metal canisters of rectangular section.

According to this invention, the canisters are soldered round their end seams or beadings by causing the canisters as they travel across the machine to be toppled over from one flat edge to another, or one flat curved edge to another, such edges dipping in sequence into an open bath of molten solder, the toppling action being continued until the whole peripheral beading round one, say the lower, edge of the canister has been soldered when the canisters may be reversed to solder similarly by a toppling action the other beaded edge, or another machine may be arranged to co-operate with the first machine, the canisters after being soldered round one edge in the first machine being then delivered into the next machine. This toppling action is effected by means of a series of angularly inclined spindles which are rocked in opposite directions by means of racks engaging pinions on the spindles, the spindles having pairs of forks or arms forming sockets to receive the canisters and turn them over from one side to another as they pass through the machine. The invention also comprises means for supplying solder to the soldering pots and for fluxing the edges of the canisters preparatory to their entering the soldering bath.

The invention is illustrated in the accompanying drawings, in which:—

Figures 1 and 1ª comprise an elevation of a soldering apparatus suitable for rectangular section canisters, the view showing the machine partly broken away in the centre.

Figure 2 is an end view; and,

Figure 3 is a cross-section through the soldering pot on the line A—A, while,

Figure 4 is an enlarged detail of the cams which operate the racks.

Figure 5 is a detail on an enlarged scale showing the means for adjusting the forks.

A suitable form of the machine comprises a series of rotatable spindles 1, 2, inclined, say, at an angle of 45 degrees, the spindles being parallel. The spindles are provided with gear wheels 3, 4 engaged by reciprocating racks 5, 6 in such a manner that one rack 5 engages the gear wheels 3 of alternate spindles, the other rack 6 engaging the gear wheels 4 on the remaining spindles. The racks are spring-controlled at 7 and alternately reciprocated against the spring control by cams 8, 9. In this way the sets of adjacent spindles 1, 2 are rotated in opposite directions. The spindles are provided with pairs of arms or forks 10, 11, and for handling rectangular canisters the arms are disposed at right angles—Figure 5—so as to form right-angled forks to hold such canisters. In order to make these forks adjustable so that they may accommodate canisters of different sizes, they are provided with extension pieces 12 bolted to the perforated arms 10, 11 of the forks in such manner that the lengths of the arms may be varied. The canisters are fed down a chute and rest with their bases against a bar 13 and are pushed while resting on this bar towards the first pair of forks to left of Figure 1, being lifted by the horizontal arms of the forks as the spindle rotates and toppled over by the rotation of the spindle towards the next pair of forks which have been just previously folded down, by the opposite rotation of their spindle, to receive the canister. From this position the canister is picked up by this second pair of forks and toppled over into the third pair of forks, and so on throughout the sequence.

During this toppling over action each straight edge of the lower bead of the canister c—Figure 3—dips into the open top of a tubular or long pot of flux 14 and ultimately into a pot of solder 15, all the straight edges of the lower beading being thus dipped in sequence in the flux and solder. The arms of the forks are arranged when horizontal to overlap as shown in Figure 1, so that one set of forks in rotating with their spindle deposit the canister on the next set of forks, then in their return position, the canister being then toppled over by such next set of forks on to the further set which are then in their return position and so on. Bunsen jets 16 beneath the solder pot keep the metal molten.

In order to keep the pot supplied with metal, solder wire is provided on a reel and led over the wheel 17, the wire passing into the bore of one of the fork spindles 18 which is tubular.

Any suitable feeding and shearing or cut-off mechanism for the solder wire may be fitted at the lower end of the tubular spindle 18, such feeding and cut-off mechanism being operated intermittently, say, from the racks or otherwise, so that short lengths of solder are cut off and fall into the pot 15.

In order to permit the machine to be suitable for soldering canisters of different sizes, the supports or bearings 19 of the fork spindles 1, 2, are slotted so that they may slide upon angle bars or the like 20 to be adjusted apart as desired, gripping screws 21 securing them in position. The inclined canisters continuously rest at their lower ends against the bar 13 which determines the depth of immersion of the canister edge in the solder pot, and this bar is preferably given a slow rotary motion by the belt 22 in order to prevent any solder or the like on the base of the canister causing the latter to stick to the bar. The cams 8, 9 actuating the racks which in turn actuate the spindles 1, 2 are so profiled as shown in Figure 4 that a quick movement is given to the forks on their return motion to pick up a new canister by the steep face $a$, the succeeding forward feed rotational movement of the spindles being slower and effected by the face $b$. Means are provided, such as the bosses 27, fitted with set screws for adjusting the forks on the spindles so as to set such forks in the best position for manipulating canisters of any size.

After the canisters have been soldered all round one edge they are re-inserted, reversed in the feed chute, in order to solder the other edge, but another machine may be fitted at right angles to the first machine and the canisters after being soldered round one edge in the first machine be delivered to, and soldered round the other edge in, the next machine.

In order to regulate the depth of immersion of the canisters in the soldering pot 15, the bar 13 against which the canisters rest is carried at one end in a telescopic bracket and stayed at the front end in a slotted bracket 23.

The cam shaft 24 is driven from the belt pulley 25, and the whole frame may be built up as shown of light angle girders 26.

To facilitate the soldering of flay oval tins, the forks 10, 11 may be correspondingly curved.

It is to be understood that any suitable drive, with applicable gearing, may be employed with the machine.

I claim:

1. A can soldering apparatus comprising a frame, racks slidably mounted in said frame, a plurality of spindles journaled in the frame at right angles to the racks, gears carried by said spindles and gears of alternate spindles meshing with opposite racks, inter-acting forks mounted on adjacent spindles, a flux container and a solder container both arranged in the order named at the bottom edge of the frame, and means for reciprocating said racks.

2. A can soldering apparatus comprising a frame, spring tensioned racks slidably mounted in said frame, a plurality of spindles journaled in the frame at right angles to the racks, gears carried by said spindles and gears of alternate spindles meshing with opposite racks, inter-acting forks mounted on adjacent spindles, a flux container and a solder container both arranged in the order named at the bottom edge of the frame, and means for reciprocating said racks comprising a shaft journaled in the frame, and cams carried by said shaft and disposed thereon in such a way as to alternately reciprocate the racks.

3. A can soldering apparatus comprising a frame, racks slidably mounted in said frame, spindles journaled in an inclined position at right angles to said racks, gears carried by said spindles and the gears of alternate spindles meshing with opposite racks, means for reciprocating the racks, can engaging members carried by the spindles, flux and solder containers arranged at the lower edge of the frame, a bar at the lower side of the frame and means for adjustably supporting said bar with reference to the flux and soldering containers to regulate the depth of immersion of the edges of the cans.

4. A can soldering apparatus comprising a frame, racks slidably mounted in said frame, spindles also journaled in the frame at right angles to the racks, gears for connecting the spindles to the racks whereby adjacent spindles are simultaneously reciprocated in opposite directions, can engaging forks carried by the spindles, and being arranged to reciprocate through an arc of 90° whereby corresponding arms of adjacent forks cooperate to transfer and receive cans from one fork to the other.

5. A can soldering machine including a frame having means for supporting and transferring a plurality of cans in an inclined position, a flux container and a solder container arranged at the lower edge of the frame in the order named, an adjustable bar adapted to constitute an abutment for the cans while they are being transferred through the machine to regulate the depth of immersion of the edges of the cans and means for rotating said bar.

In testimony whereof I have affixed my signature hereto this 26th day of October 1922.

WILLIAM JOHN LUXTON.